United States Patent Office 2,901,151
Patented Aug. 25, 1959

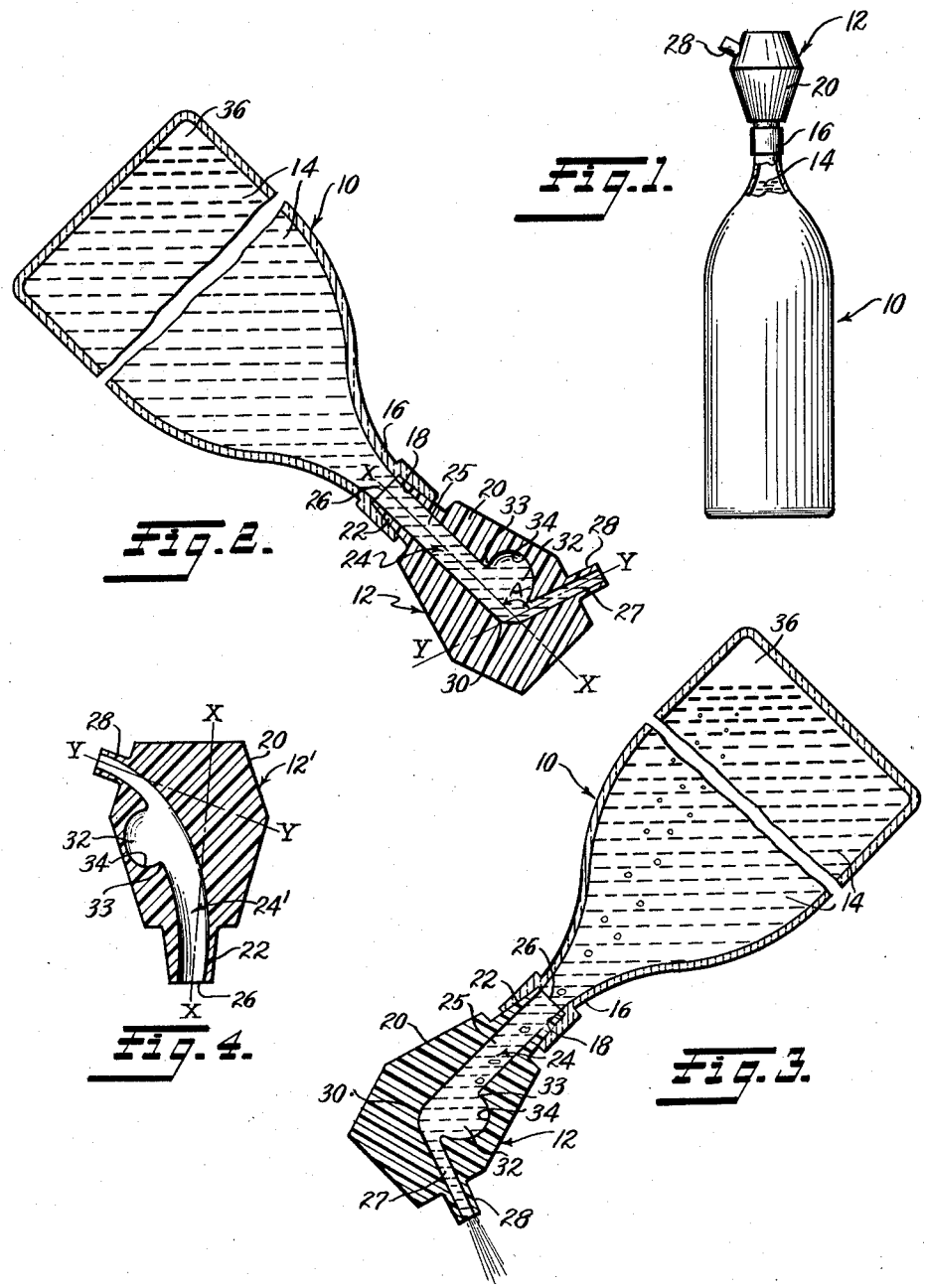

2,901,151

VACUUM TYPE DISPENSER

Paul C. Kiyuna, Wahiawa, Oahu, Territory of Hawaii

Application July 18, 1958, Serial No. 749,446

17 Claims. (Cl. 222—456)

This invention relates to measuring devices, and more particularly to measuring and dispensing devices adapted to be attached to a tiltable container to measure and dispense predetermined quantities of liquid therefrom.

In general the invention comprises a device which includes an elongated passage having, at one end thereof, an inlet port and, at the other end, an outlet spout. Between the inlet port and outlet spout, the passage undergoes a change in direction, whereby the axis of the inlet port and the axis of the outlet spout form between them an obtuse angle, i.e., an angle that lies between 90° and 180°. A trap chamber is provided between the inlet port and outlet spout, which communicates with the passage on the obtuse angle side at the region in which the passage changes its direction. The trap chamber is provided with a dome, and is so related to the passage that, when the container is tilted to a pouring position with the trap chamber above the passage, a volume of air will be trapped in the dome, and when the container is then oriented to a position in which the trap chamber is below the passage, the trapped volume of air is released and bubbles upward through the liquid in the container to displace an equivalent volume of liquid which is dispensed through the pouring spout.

It is therefore an object of this invention to provide a measuring and dispensing device adapted to accurately measure a predetermined quantity of a liquid from a container and to dispense the same as desired.

It is a further object of the invention to provide a measuring and dispensing device as set forth that is of extremely simple construction, requires no moving parts, can be made in one piece, is economical to produce, and efficient and dependable in operation.

Additional and further objects and advantages will become apparent to those skilled in the art as the description proceeds in connection with the accompanying drawings wherein:

Fig. 1 is a view in elevation of the dispensing device fitted onto a liquid container;

Fig. 2 is a sectional view of one form of the invention showing the position in which the container and dispensing device are tilted prior to dispensing;

Fig. 3 is a sectional view of the form of Fig. 2 showing the orientation of the container and dispensing device in dispensing position, and Fig. 4 is a sectional view of a modified form of dispensing device.

Referring to Figs. 1 to 3 of the drawing, the novel measuring and dispensing device is shown at 12 in connection with a container 10 adapted to hold a liquid 14. The device 12 may be of any desirable or suitable shape, and is shown in the form of a pair of truncated cones having the bases joined together to provide an enlarged mid-section which tapers toward the opposite ends.

The measuring and dispensing device 12 is made of a suitable material such as rubber, elastomeric plastic and the like, or may be made of other materials, such as cork enclosing a glass or plastic passageway.

The measuring and dispensing device 12 comprises a body portion 20 having a plug portion 22 at one end thereof and an outlet spout 28 adjacent the other end. The plug portion 22 is adapted to be received within an outlet 18 provided in the neck 16 of container 10. Instead of plug portion 22 adapted to be received within opening 18, it is obvious that a cap may be substituted therefor, which cap is adapted to fit around the outlet of container 10.

The measuring and dispensing device includes an elongated passage 24, which extends from an inlet port 26 in plug portion 22 to the pouring spout. With reference to the modification shown in Figs. 2 and 3, the elongated passage 24 comprises an inlet leg 25 and an outlet leg 27. Legs 25 and 27, as shown, are straight, and are joined by a curved section 30. Instead of a curved section 30 at the junction of legs 25 and 27, it is obvious that the junction may be a sharp angle formed by the meeting of the walls of the legs. Inlet leg 25 communicates at one end with inlet port 26 and at its other end with outlet leg 27. Outlet leg terminates at pouring spout 28.

As shown in Fig. 2, the axis X—X of leg 25 and the axis Y—Y of leg 27 are so related to one another as to form an obtuse angle A at their point of intersection, that is, an angle between 90° and 180°. At the juncture of legs 25 and 27, and on the obtuse angle side thereof, there is provided a trap chamber 32 of generally bulbous form, which communicates with the passageway 24. Trap chamber 32 is provided with a dome 34 of generally spherical form for a purpose to be described hereinafter.

The cross sectional area of passageway 24 is so selected with reference to the head and viscosity of the liquid in container 10 so that there will be no flow of liquid from container 10 when inverted. For this purpose the outlet area of the spout 28 is rather small, the exact size depending on the viscosity and weight of the liquid to be measured and dispensed. Considering Fig. 2, in which the container 10 is shown in an inverted position, the tendency of the liquid to flow toward a lower level will produce a pocket 36 in the uppermost corner of the container in which a condition of vacuum, or zero pressure, will obtain. Atmospheric pressure, at about 15 pounds per square inch, acts on the liquid at the outlet of spout 28, which pressure is greater than the head of liquid in the container 10 and in the measuring and dispensing device 12, and consequently there will be no flow of liquid.

The operation is as follows: With the parts in their upright position as shown in Fig. 1, the liquid 14 is shown as extending upward to neck 16, and the space above the liquid in container 10 and in the passage 24 and trap chamber 32 is filled with air. When the parts are inverted to a position approximately as shown in Fig. 2, the tendency of the liquid to flow to a lower level will cause liquid 14 to flow into passage 24 and trap chamber 32, forcing the air ahead of it. The liquid 14 will fill passage 24 and trap chamber 32 except the upper portion of dome 34 in which a small quantity of air is trapped and compressed. As shown in Fig. 2, the trap chamber 32 is so shaped that its point of connection with passage 24 provides a lip 33. The liquid in the trap chamber, in contacting lip 33, seals a small volume of air within the dome 34. The vacuum condition obtaining in pocket 36 and atmospheric pressure acting on the liquid at the outlet of spout 28 are sufficient to retain the liquid in the container 10 and passageway 24 as shown without flow. When the container is tilted to the position approximately as shown in Fig. 3, the small volume of compressed air trapped in dome 34 is released, which will bubble upward through the liquid 14, as shown, into pocket 36. The pressure in pocket 36 is slightly increased, which will permit the dispensing of a small quantity of liquid from spout 28, followed by a drop in level of liquid in container 10 and an increase in volume of pocket 36 until a new point of equilibrium between the head of liquid 14 in the container 10 and elongated passage 24 on the one hand, and the pressure in pocket 36 and atmospheric pressure on the other hand, is reached, whereupon dispensing will cease. The parts are then returned to their upright position shown in Fig. 1, whereupon the operation may be repeated.

The quantity of liquid dispensed at each operation depends upon the volume of air permitted to enter pocket 36. In other words, the air will displace substantially an equal volume of liquid. From the foregoing it becomes apparent that the volume of the dome of the trap chamber determines the quantity of liquid dispensed, and it becomes a simple matter to construct the trap chamber and dome of the dimension to meter and dispense the desired quantity of liquid for each inversion of the container.

While, in the above description of operation, the parts have been moved from the filling position shown in Fig. 2 to the dispensing position shown in Fig. 3 by reorientation about a transverse axis, it is apparent that the same result could be obtained by maintaining the inclination of Fig. 2 substantially constant and in rotating the parts about the longitudinal axis of the container until the trap chamber lies below the axis X—X of the inlet leg 25, or by any combination of movements about the longitudinal or transverse axes to bring trap chamber into a position in which the trapped air in dome 34 is released and displaced by liquid.

Fig. 4 shows a modified form of a measuring and dispensing device 12' in which the elongated passageway 24' describes a continuous curve from its inlet port 26 in plug portion 22 to the outlet of spout 28. In this modification, as in the modification of Figs. 2 and 3, the axis X—X through inlet port 26 and the axis Y—Y through the outlet port of spout 28 form an obtuse angle.

It is apparent that the elongated passageway could be made of a plurality of straight sections, or curved, or of a combination of curved and straight sections, and that the curvature could follow the arc of a circle or any other curved form having changing radii.

In both of the embodiments the devices are shown as being of one-piece or integral construction. It is to be understood, however, that the device may be fabricated by forming different portions thereof separately and later assembling and joining them in any suitable manner. It is also contemplated that different portions may be formed of different materials.

While a limited number of embodiments of the invention are shown and described herein, it is to be understood that the disclosed embodiments are merely illustrative of preferred forms. Other embodiments are contemplated within the scope of the invention as defined in the appended claims.

I claim:

1. A vacuum type dispenser for dispensing a metered quantity of liquid from a container, comprising a member including a passage having an inlet port and an outlet spout, said passage undergoing a change in direction between said inlet port and said outlet spout whereby the axes of said inlet port and spout form an obtuse angle between them, and an air trap chamber disposed in the region of such direction change wholly on the obtuse angle side of and communicating with said passage.

2. A vacuum type dispenser according to claim 1, in which said direction change is provided by a curved portion of the passage.

3. A vacuum type dispenser according to claim 1, in which said trap chamber includes a dome for the entrapment of air, said dome, when the upper end of the container to which the dispenser is attached is downwardly tilted, is effective to trap a body of air in the upper part of said dome.

4. A vacuum type dispenser according to claim 1, in which the dispenser is arranged at least partially within a stopper having means to fit the outlet of the container.

5. A vacuum type dispenser according to claim 2, in which the curved portion extends from said inlet port to said outlet spout.

6. A vacuum type dispenser according to claim 2, in which the curved portion joins two straight portions.

7. A vacuum type dispenser for dispensing a metered quantity of liquid from a container, comprising a member including an elongated passage having one leg serving as an inlet and another leg serving as an outlet, the axes of said legs forming an obtuse angle with each other, and an enlarged air trap chamber communicating with such passage at the intersection of the axes.

8. A vacuum type dispenser according to claim 7, in which said legs are connected by a curved portion.

9. A vacuum type dispenser according to claim 7, in which said air trap chamber connects only with that side of the passage forming the obtuse angle.

10. A vacuum type dispenser according to claim 7, in which said air trap chamber includes a dome, said dome, when the upper end of the container to which the dispenser is attached is downwardly tilted, is effective to trap a body of air in the upper part of said dome.

11. A vacuum type dispenser according to claim 7, in which the dispenser is arranged at least partially within a stopper having means to fit the outlet of the container.

12. A vacuum type dispenser according to claim 8, in which the inlet leg and outlet leg are straight.

13. A vacuum type dispenser for dispensing a metered quantity of liquid from a container, comprising a member, adapted to be connected to a container, including an elongated passage having an inlet leg and an outlet leg, the axes of said legs forming an angle with each other, an enlarged air trap chamber communicating with said passage at the intersection of the axes, said air trap chamber including a dome, said dome being adapted to trap a volume of air above the liquid when positioned relative to the passage and air trap chamber when the container is inverted with its longitudinal axis at an acute angle with the vertical, and to release such trapped air and dispense a corresponding volume of liquid when the dome is disposed at a different position relative to the passage and trap chamber.

14. A vacuum type dispenser according to claim 13 in which said air trap chamber connects only with that side of the passage forming the smaller angle.

15. A vacuum type dispenser according to claim 13 in which the legs are connected by a curved portion.

16. A vacuum type dispenser according to claim 13 in which the inlet leg and the outlet leg are straight.

17. A vacuum type dispenser according to claim 13 in which the outlet leg is provided with a pouring spout.

References Cited in the file of this patent

UNITED STATES PATENTS

| 151,066 | Warner | May 19, 1874 |
| 820,679 | Studley | May 15, 1906 |
| 2,475,720 | Preston | July 12, 1949 |
| 2,609,972 | Szekely | Sept. 9, 1952 |